P. C. JUHL.
OBSTETRICAL TABLE.
APPLICATION FILED AUG. 29, 1919.
1,372,513.
Patented Mar. 22, 1921.
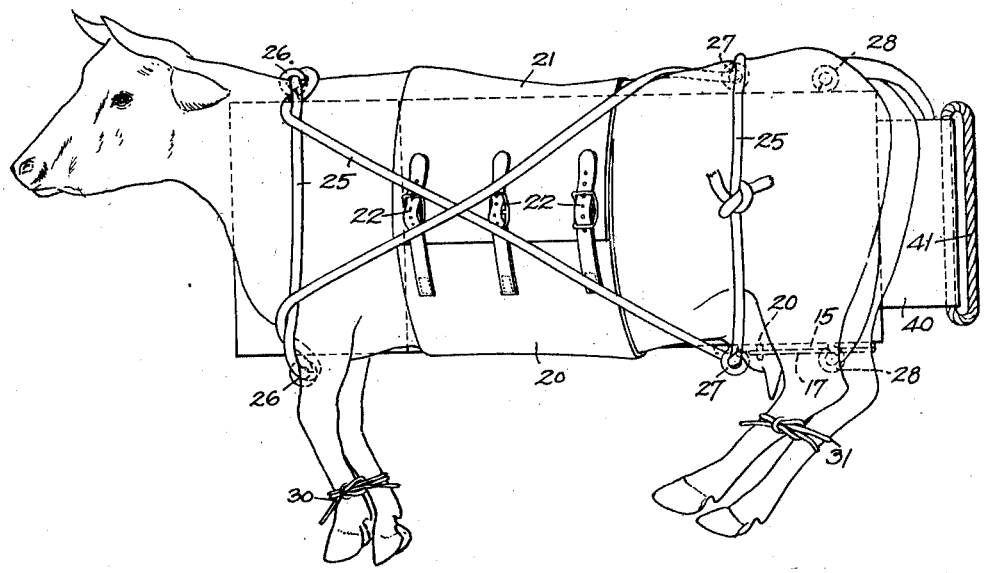
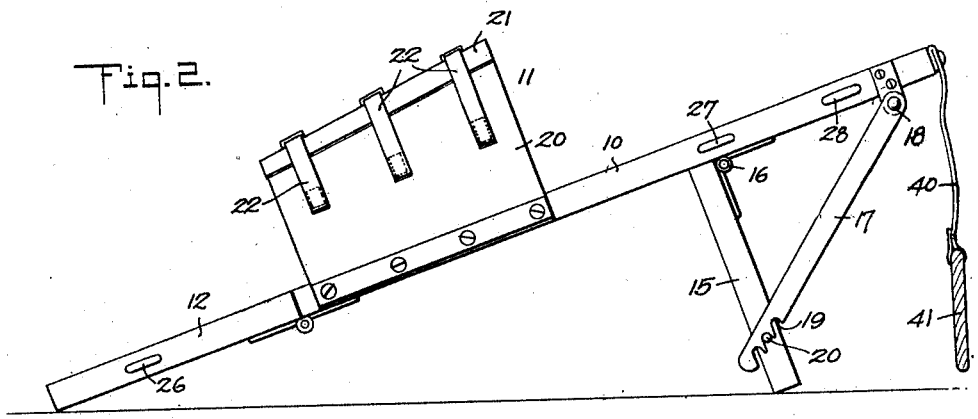
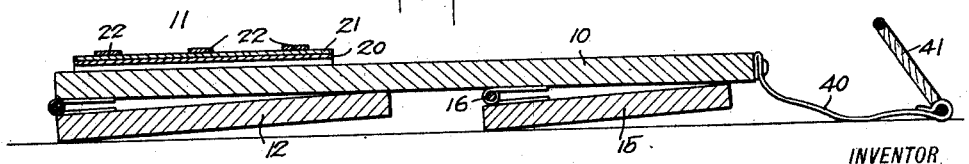
WITNESSES
INVENTOR
Peter C. Juhl
BY
ATTORNEYS

UNITED STATES PATENT OFFICE.

PETER C. JUHL, OF NEW YORK, N. Y.

OBSTETRICAL TABLE.

1,372,513.  Specification of Letters Patent.  Patented Mar. 22, 1921.

Application filed August 29, 1919. Serial No. 320,633.

*To all whom it may concern:*

Be it known that I, PETER C. JUHL, a citizen of the United States, and a resident of the city of New York, Richmond Valley, borough of Richmond, in the county of Richmond and State of New York, have invented a new and Improved Obstetrical Table, of which the following is a full, clear, and exact description.

The object of the invention is to provide a new and improved obstetrical table more especially designed for supporting a pregnant cow, horse, or other animal in proper position to enable a veterinary surgeon or other person to conveniently operate on such animal particularly in case the fetus is in abnormal position.

Another object is to enable the surgeon to operate on the animal while the latter is lying on the side and the surgeon is in standing position thus enabling the surgeon to conveniently operate on the animal with a view of delivering the fetus, while the animal is prevented from pressing against the surgeon.

Another object is to support the animal on one side and in an inclined position with the head downward to allow the fetus to fall downward thereby providing more room in the womb for readily changing the position of the fetus.

With these and other objects in view, the invention consists of certain novel features of construction, as hereinafter shown and described and then specifically pointed out in the claims.

A practical embodiment of the invention is represented in the accompanying drawings forming a part of this specification, in which similar characters of reference indicate corresponding parts in all the views.

Figure 1 is a plan view of the obstetrical table with a cow in position thereon;

Fig. 2 is an enlarged side elevation of the obstetrical table; and

Fig. 3 is a similar view of the same with the parts in folded position.

The obstetrical table, in its general construction consists of an inclined table top 10 provided with strapping means 11 adapted to be passed around the animal's body intermediate the fore and hind legs of the animal to support the animal with one side resting on the table top and with the head in lowermost position, as plainly shown in Fig. 1. The table top is preferably provided at one end with a hinged section 12 adapted to rest with its free end on the ground and adapted to be folded under the table top, as shown in Fig. 3, to permit convenient transportation and storing of the obstetrical table.

In order to support the table top 10 in an inclined position, use is made of a leg 15 connected by a hinge 16 to the under side of the table top near the upper end thereof, and this leg 15 is held in extended position by a brace 17 fulcrumed at 18 on one side of the table top 10 adjacent the upper end thereof. The brace 17 is provided at its free end with notches 19, any one of which is adapted to engage a pin 20 held on the leg 15 near the lower end thereof. By providing a number of notches 19 the table top 10 can be adjusted to a more or less inclined position.

The strapping means 11 is preferably in the form of a wide band made in sections 20 and 21 fastened to the sides of the table top 10 intermediate the ends thereof, and the said band sections 20 and 21 are provided at their free ends with buckle straps 22 to allow of drawing the band sections tight on the animal's body and to fasten the said free ends together in overlapping relation.

In order to additionally hold the animal securely in place on the table top 10 use is made of tying cords or ropes 25 adapted to be passed through eyes 26 and 27 attached to the sides of the table top near the lower and upper ends thereof. Screw eyes 28 are also attached to the sides of the table top 10 adjacent the upper end thereof for additional tying cords or ropes, if deemed necessary. The eyes 27 and 28 also serve as handles to permit of swinging the table top 10 with the animal strapped in position thereon from ground or horizontal position into the inclined position shown in Figs. 1 and 2. It is understood that in practice the table top 10 is flat on the ground with the leg 15 in folded position to allow of conveniently throwing the animal sidewise onto the table top and strapping it thereon with the fore feet and the hind feet tied together by suitable thongs 30 and 31, as shown in Fig. 1. The table top 10 is then swung upward and the leg 15 moved into position to support the table top 10 and the animal strapped thereto in an inclined position and with the animal's head lowermost.

It will be noticed that when the animal is in this position, the veterinary surgeon or other operator can readily operate on the animal while the operator is in standing position. By supporting the animal in an inclined position with the head downward, the fetus falls forward thereby providing more room inside of the womb for readily changing an abnormal position of the fetus. As the animal has the feet off the ground, it loses the power of pressing against the operator and hence the latter is enabled to perform the work expeditiously and without hindrance by the animal.

On the upper end of the table top 10 is secured one end of an apron 40 of canvas, rubber, or other suitable and preferably impervious material, and on the free end of this apron is secured a loop 41 adapted to engage the neck of the operator to hold the apron in extended position for temporarily supporting the uterus of the animal. Other suitable means for supporting the free end of the apron 20 may be used.

By the use of the obstetrical table shown and described, an animal can be quickly relieved of a fetus without injury to the mother.

Having thus described my invention, I claim as new and desire to secure by Letters Patent:

1. An obstetrical table, comprising a table top adapted to rest flat on the ground to permit of throwing an animal sidewise onto the table top, strapping means mounted on the said table top and adapted to be strapped around the animal on the table top, handles on the end of the table top on which rests the tail end of the animal to allow of raising this end of the table top manually and with the other end resting on the ground, and supporting means on the end of the table top having the said raising means to support the table top in inclined position and with the head of the animal downward.

2. An obstetrical table, comprising a table top adapted to rest flat on the ground to permit of throwing an animal sidewise onto the table top, a two-part strapping band attached to the sides of the table and having fastening straps at the free ends for fastening the latter together, the said band being adapted to be strapped around the animal intermediate its fore and hind legs, handles on the end of the table top on which rests the tail end of the animal to allow of raising this end of the table top manually and with the other end resting on the ground, and supporting means on the end of the table top having the said handles to support the table top in inclined position and with the head of the animal downward.

3. An obstetrical table, comprising a table top, means near one end of the said table top for holding the latter in an inclined position, a two-part band attached to the sides of the table and having fastening straps at the free ends for fastening the latter together, the said band being adapted to be strapped around an animal intermediate its fore and hind legs to support the animal on one side on the said table top and with the head downward, eyes at the sides of the said table top adjacent the upper and lower ends thereof, and flexible strapping means engaging the said eyes and adapted to be passed around the animal.

4. An obstetrical table, comprising a table top adapted to rest flat on the ground to permit of throwing an animal sidewise onto the table top, strapping means mounted on the said table top and adapted to be strapped around the animal on the table top, handles on the end of the table top on which rests the tail end of the animal to allow of raising this end of the table top manually and with the other end resting on the ground, supporting means on the end of the table top having the said raising means to support the table top in inclined position and with the head of the animal downward, and a flexible supporting means secured at one end on the raised end of the table top and adapted to temporarily support the uterus, the said flexible supporting means having at its other end an attaching device for supporting connection with the operator.

5. An obstetrical table, comprising a table top, means near one end of the said table top for holding the latter in an inclined position, strapping means mounted on the said table top and adapted to be strapped around an animal intermediate its fore and hind legs to support the animal with one side on the said table top and with the head downward, and an apron attached at one end to the upper end of the said table and provided at its free end with a loop adapted to engage the operator's neck.

PETER C. JUHL.